United States Patent
Inagaki et al.

(10) Patent No.: US 12,469,149 B2
(45) Date of Patent: Nov. 11, 2025

(54) IMAGE PROCESSING APPARATUS AND METHOD OF PROCESSING IMAGE

(71) Applicant: CANON KABUSHIKI KAISHA, Tokyo (JP)

(72) Inventors: Yu Inagaki, Tokyo (JP); Keisuke Midorikawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 686 days.

(21) Appl. No.: 17/689,057

(22) Filed: Mar. 8, 2022

(65) Prior Publication Data
US 2022/0292692 A1    Sep. 15, 2022

(30) Foreign Application Priority Data
Mar. 12, 2021   (JP) .................... 2021-040696

(51) Int. Cl.
*G06T 7/215*     (2017.01)
*H04N 23/61*     (2023.01)
(Continued)

(52) U.S. Cl.
CPC .............. *G06T 7/215* (2017.01); *H04N 23/61* (2023.01); *H04N 23/67* (2023.01); *H04N 23/681* (2023.01)

(58) Field of Classification Search
CPC ........... G06T 2207/10024; G06T 7/215; G06T 7/248; H04N 23/61; H04N 23/67; H04N 23/681; H04N 23/683; H04N 32/67
(Continued)

(56) References Cited

U.S. PATENT DOCUMENTS

2010/0278520 A1*  11/2010  Karasawa ............... G02B 7/34
                                                           396/95
2015/0062381 A1*  3/2015   Na ......................... G06T 11/60
                                                           348/239

(Continued)

FOREIGN PATENT DOCUMENTS

JP    2012-138013 A    7/2012
JP    2012-138845 A    7/2012
(Continued)

OTHER PUBLICATIONS

Reasons for Refusal issued Jan. 10, 2025, in corresponding Japanese Patent Application No. 2021-040696, with English translation (9 pages).

(Continued)

*Primary Examiner* — Kenny A Cese
(74) *Attorney, Agent, or Firm* — Venable LLP

(57) ABSTRACT

An image processing apparatus includes one or more processors that execute a program and thereby function as a setting unit that sets a tracking target region, a generating unit that generates a template to be used in template matching based on a set tracking target region, and a detecting unit that detects, in a current image, a first region that is similar to a template generated by the generating unit, by applying template matching using the template to the image. Therein the setting unit sets, as a new tracking target region, the first region detected in the current image by the detecting unit or a second region of the current image whose position corresponds to a previously set tracking target region.

15 Claims, 5 Drawing Sheets

(51) Int. Cl.
*H04N 23/67* (2023.01)
*H04N 23/68* (2023.01)

(58) Field of Classification Search
USPC .......................................................... 382/103
See application file for complete search history.

(56) References Cited

U.S. PATENT DOCUMENTS

| 2016/0003936 | A1* | 1/2016 | Hibino | G01S 13/931 |
| | | | | 342/27 |
| 2018/0059359 | A1* | 3/2018 | Hongu | H04N 23/672 |
| 2021/0271257 | A1* | 9/2021 | Watanabe | G06F 18/24 |
| 2022/0051413 | A1* | 2/2022 | Itsumi | H04N 7/18 |

FOREIGN PATENT DOCUMENTS

| JP | 2013-157725 A | 8/2013 | | |
| JP | 2019134438 A | 8/2019 | | |
| JP | 2020095673 A | 6/2020 | | |
| WO | WO-2020184539 A1 * | 9/2020 | ............... | G06T 7/20 |

OTHER PUBLICATIONS

Notice of Reasons for Refusal issued Jun. 2, 2025, in corresponding Japanese Application No. 2021-040696, with English translation (11 pages).

* cited by examiner

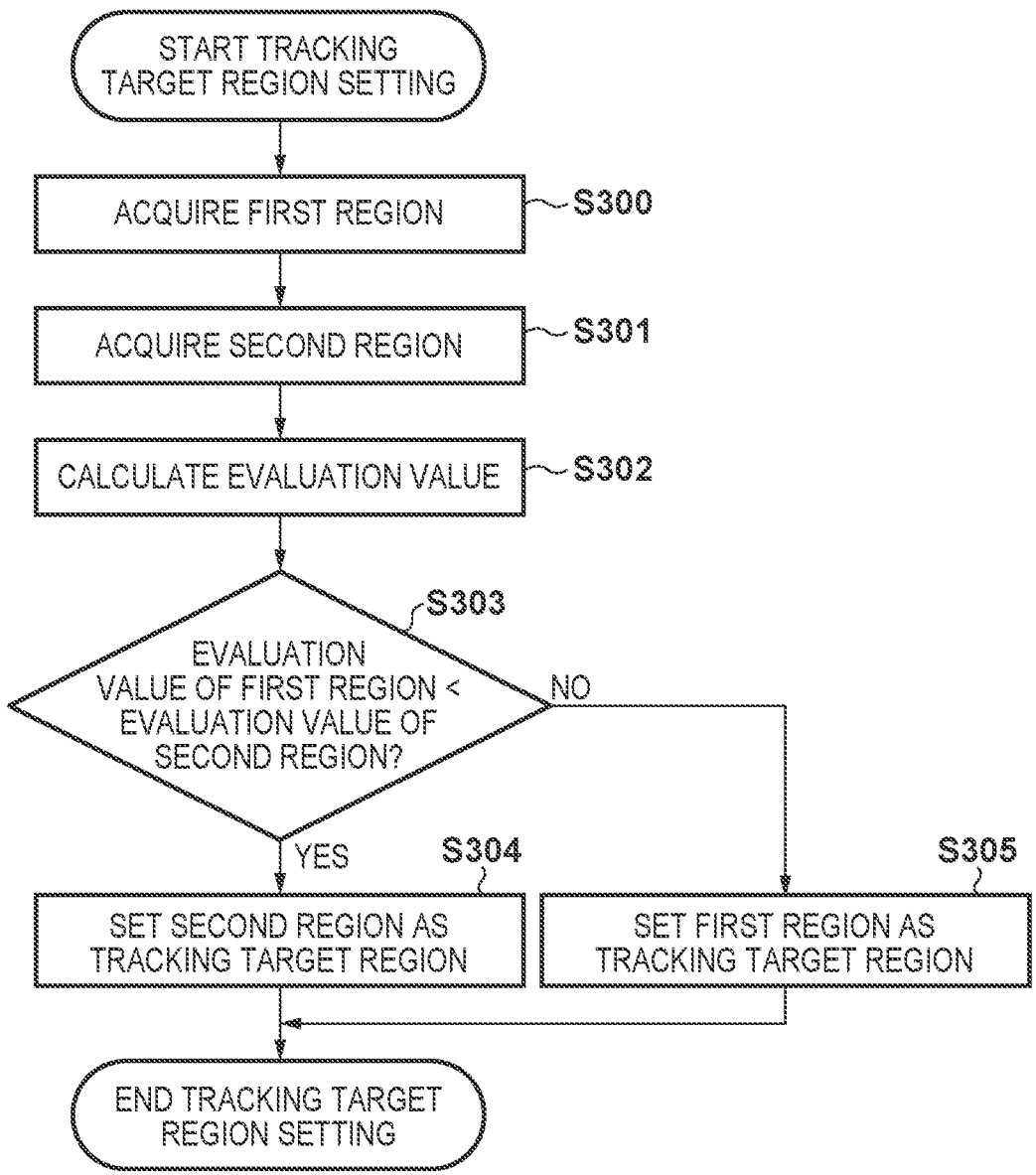

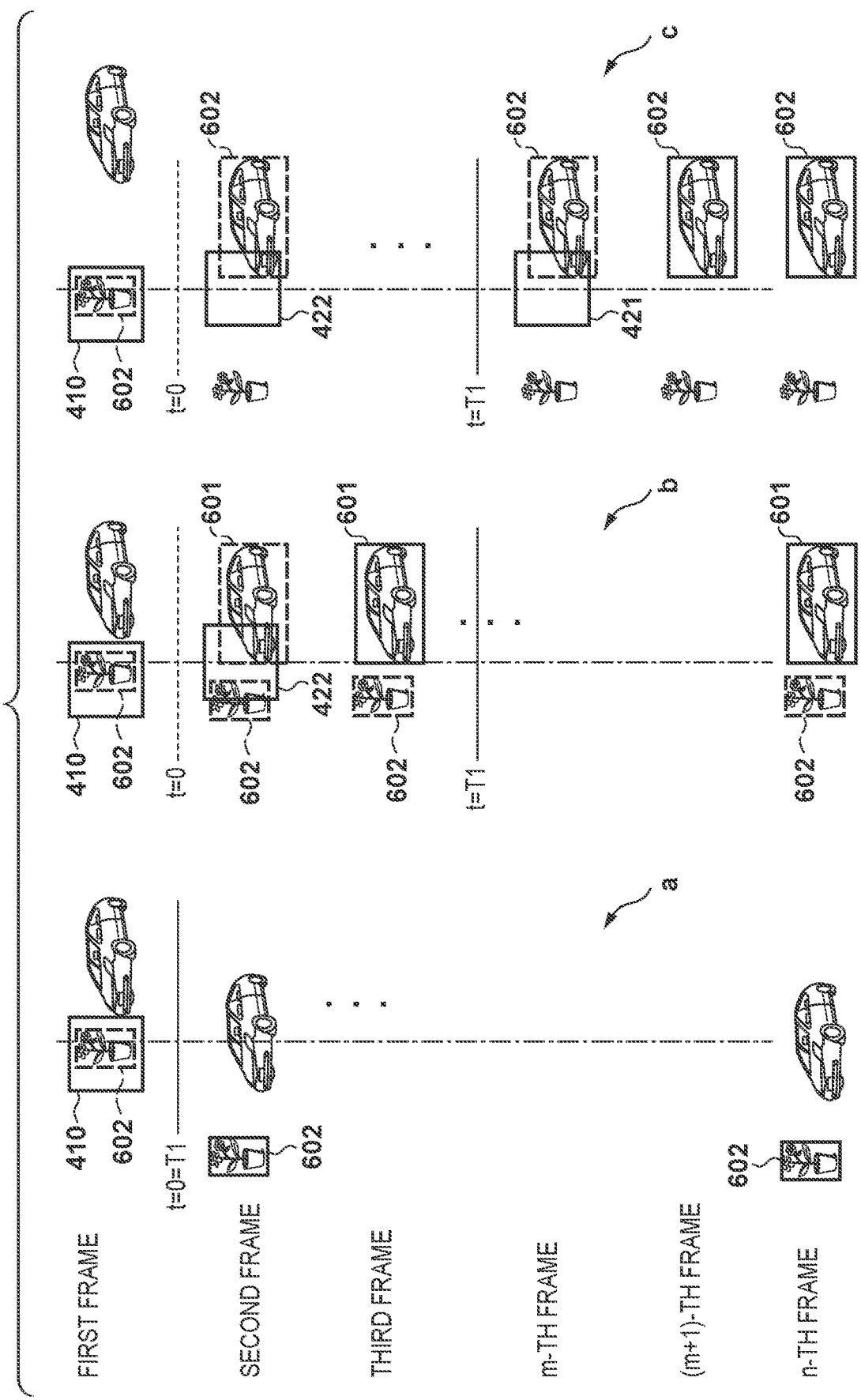

IMAGE PROCESSING APPARATUS AND METHOD OF PROCESSING IMAGE

CROSS-REFERENCE TO PRIORITY APPLICATION

This application claims the benefit of Japanese Patent Application No. 2021-040696, filed on Mar. 12, 2021, which is hereby incorporated by reference herein in its entirety.

BACKGROUND OF THE INVENTION

Field of the Invention

The present invention relates to an image processing apparatus and a method of processing an image and, in particular, to a technique of tracking a subject.

Description of the Related Art

A subject tracking technique is known for sequentially searching for regions (subject regions) capturing a specific subject in multiple images captured in time series. Template matching is a known technique for searching for a subject region (Japanese Patent Laid-Open No. 2019-134438). Template matching is a technique for searching for a region having the highest similarity with an image registered as a template in an image to be searched. A measure of similarity with an image region having the same size as the template can be obtained through various methods. For example, the sum of absolute difference values between corresponding pixels can be obtained as a measure of similarity, and, in such a case, a lower sum indicates a higher similarity.

For example, by performing an operation of specifying a position in a live view display image, the user can specify the subject that is to be tracked. In such a case, the user can specify a desired position through a touch operation on a touch display providing a live view display or by moving a pointer, such as a cursor, through a combination of key and button operations.

However, since the operation of specifying a position is performed while the image capture apparatus is being held, the specified position may shift from the region of the intended subject. In such a case, tracking processing is executed while a region not intended by the user is used as a template, and it may not be possible to track the subject intended by the user.

SUMMARY OF THE INVENTION

An aspect of the present invention provides an image processing apparatus and an image processing method capable of at least alleviating the problems of such conventional techniques and appropriately updating a tracking target region even when the tracking target region is specified at a position shifted from a region of an intended subject.

According to an aspect of the present invention, an image processing apparatus comprises one or more processors that execute a program and thereby function as a setting unit that sets a tracking target region, a generating unit that generates a template to be used in template matching based on a set tracking target region, and a detecting unit that detects, in an image, a first region that is similar to a template generated by the generating unit, by applying template matching using the template to the image, wherein the setting unit sets, as a new tracking target region, the first region detected in a current image by the detecting unit or a second region of the current image whose position corresponds to a previously set tracking target region.

According to another aspect of the present invention, an image processing apparatus comprises one or more processors that execute a program and thereby function as a setting unit that sets a tracking target region, and a detecting unit that detects, based on a set tracking target region, a first region similar to the tracking target region in an image, wherein the setting unit sets, as a new tracking target region, the first region detected in a current image or a second region of the current image whose position corresponds to a previously set tracking target region.

According to a further aspect of the present invention, an image processing method for subject tracking comprises setting a tracking target region, generating a template to be used in template matching based on the set tracking target region, and detecting, in an image, a first region that is similar to a template generated by the generating, by applying template matching to the image using the template, wherein the setting includes setting, as a new tracking target region, the first region detected in a current image in the detecting or a second region of the current image whose position corresponds to a previously set tracking target region.

According to another aspect of the present invention, an image processing method for subject tracking comprises setting a tracking target region, and detecting, based on a set tracking target region, a first region similar to the tracking target region in an image, wherein the setting sets, as a new tracking target region, the first region detected in a current image or a second region of the current image whose position corresponds to a previously set tracking target region.

According to a further aspect of the present invention, a non-transitory computer-readable storage medium storing a program that causes, when executed by a computer, the computer to function as an image processing apparatus comprising a setting unit that sets a tracking target region, a generating unit that generates a template to be used in template matching based on a set tracking target region, and a detecting unit that detects, in an image, a first region that is similar to a template generated by the generating unit, by applying template matching using the template to the image, wherein the setting unit sets, as a new tracking target region, the first region detected in a current image by the detecting unit or a second region of the current image whose position corresponds to a previously set tracking target region.

According to another aspect of the present invention, a non-transitory computer-readable storage medium storing a program that causes, when executed by a computer, the computer to function as an image processing apparatus comprising a setting unit that sets a tracking target region, and a detecting unit that detects, based on a set tracking target region, a first region similar to the tracking target region in an image, wherein the setting unit sets, as a new tracking target region, the first region detected in a current image or a second region of the current image whose position corresponds to a previously set tracking target region.

Further features of the present invention will become apparent from the following description of exemplary embodiments (with reference to the attached drawings).

BRIEF DESCRIPTION OF THE DRAWINGS

FIG. 3 is a flowchart related to the details of the tracking target region setting processing in FIG. 2.

FIG. 5 is a schematic diagram for explaining the effect of a first predetermined time T1 according to an embodiment.

DESCRIPTION OF THE EMBODIMENTS

Figure 1:
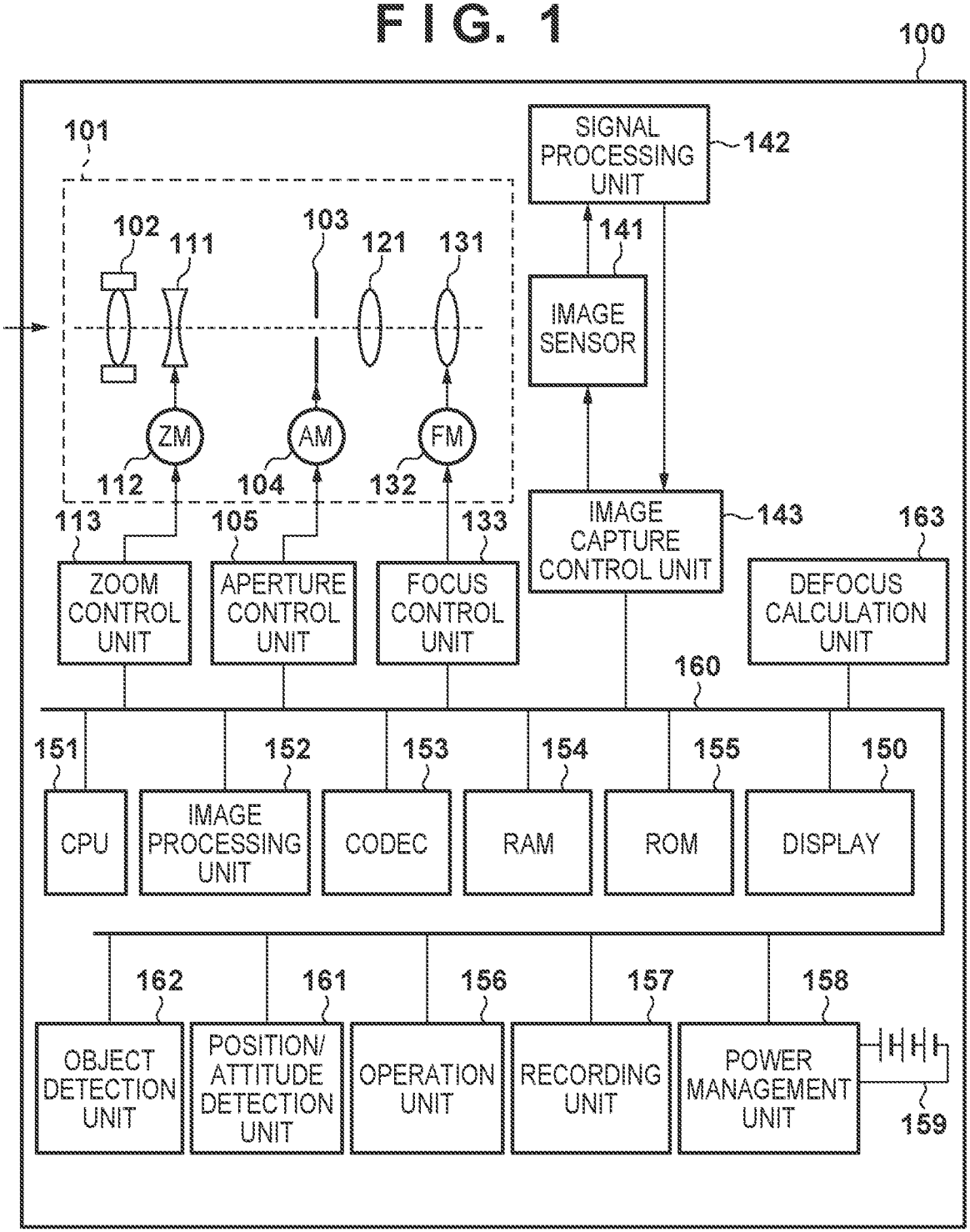
FIG. 1 is a block diagram illustrating a functional configuration example of an image capture apparatus as an example of an image processing apparatus according to an embodiment.

Embodiments will now be described in detail with reference to the accompanying drawings. Note that the following embodiments do not limit the invention according to the claims. Although the embodiments describe multiple features, not all of these features are essential to the invention, and the features may be combined in any way. Furthermore, the same or similar components are denoted by the same reference numerals in the accompanying drawings, and redundant descriptions are omitted.

Note that, in the following embodiments, cases will be described in which the present invention is implemented by an image capture apparatus, such as a digital camera or a digital video camera. However, the image capture function is not essential in the present invention, and the present invention can be implemented by any electronic device capable of handling image data. Such electronic devices include video cameras, computer devices (personal computers, tablet computers, media players, PDAs, etc.), cellular phones, smartphones, game machines, robots, drones, and drive recorders. These are examples, and the present invention can be implemented by other electronic devices.

Configuration of Image Capture Apparatus

A configuration example of an image capture apparatus 100 will be described as an example of an image processing apparatus according to an embodiment of the present invention with reference to FIG. 1. Here, it is presumed that the lens unit 101 of the image capture apparatus 100 cannot be replaced, but the present invention can also be implemented by a lens-interchangeable image capture apparatus.

The lens unit 101 includes fixed lenses 102 and 121, a zoom lens 111 and a focusing lens 131 that are movable lenses, and a diaphragm 103. Note that the individual lenses described as one lens in the drawing may be composed of multiple lenses.

The diaphragm 103 also serves as a shutter. The aperture diameter and opening/closing operation of the diaphragm 103 are controlled by driving an aperture motor 104 (AM) by an aperture control unit 105 under the control of a CPU 151.

The zoom lens 111 changes the focal length (angle of view) of the lens unit 101 by moving along the optical axis of the lens unit 101. The position of the zoom lens 111 is controlled by driving a zoom motor 112 (ZM) by a zoom control unit 113 under the control of the CPU 151.

The focusing lens 131 changes the focusing distance of the lens unit 101 by moving along the optical axis of the lens unit 101. The position of the focusing lens 131 is controlled by driving a focusing motor 132 (FM) by a focusing control unit 133 under the control of the CPU 151. The driving direction and the driving amount of the focusing lens 131 are determined by the CPU 151 in accordance with the defocus amount calculated by a defocus calculation unit 163.

The CPU 151 (main control unit) is one or more processors. The CPU 151, for example, loads one or more programs stored in a ROM 155 to a RAM 154 and executes the loaded programs to control function blocks connected to a bus 160 and thereby provides the functions of the image capture apparatus 100. Note that, at least some of the functions provided by the function blocks connected to the bus 160 may be implemented by the CPU 151 executing programs.

The lens unit 101 forms an optical image of the subject on an image capture surface of an image sensor 141. The image sensor 141 may be, for example, a CCD image sensor or a CMOS image sensor, including a color filter. Multiple pixels including photoelectric converters are arranged in, for example, a matrix in the image sensor 141, and an optical image of the subject is converted into an analog image signal by the pixels. The image sensor 141 includes circuits for controlling the operation of the pixels. The analog image signals read from the image sensor 141 are fed to a signal processing unit 142.

The signal processing unit 142 applies processing such as noise removal, defective pixel correction, and A/D conversion to the analog image signals, and generates RAW format digital image signals (RAW image data). The signal processing unit 142 outputs the RAW image data to an image capture control unit 143.

The image capture control unit 143 stores the RAW image data in the RAM 154. The image capture control unit 143 also controls the operation of the image sensor 141 under the control of the CPU 151.

An image processing unit 152 applies predetermined image processing to the RAW image data stored in the RAM 154 to generate signals and image data and to acquire and/or to generate various kinds of information. The image processing unit 152 may be, for example, a dedicated hardware circuit, such as an ASIC designed to implement a specific function, or software executed by a programmable processor, such as a DSP, to implement a specific function.

Here, the image processing applied by the image processing unit 152 includes color interpolation processing, correction processing, data processing, evaluation value calculation processing, special effect processing, and the like. The color interpolation processing is performed on individual pixels to interpolate the value of a color component not obtained at the time of image capture from the value of a peripheral pixel. This processing is also called demosaic processing. The correction processing includes white balance adjustment, gradation correction (gamma processing), processing for correcting the influence of optical aberration and peripheral dimming of the lens unit 101, processing for correcting colors, and the like. Data processing includes composition processing, scaling processing, header information generation processing of a data file, and the like. The evaluation value calculation processing includes generation of signals and evaluation values used for automatic focus detection (AF) and calculation processing of evaluation values used for automatic exposure control (AE). The special effect processing includes adding blur, changing color tones, and relighting processing. The image processing unit 152 can also apply image processing by using detection results obtained by an object detection unit 162 described below. For example, the image processing unit 152 can execute pattern matching (arithmetic processing of a value (correlation amount) indicating the degree of correlation between image regions) in subject tracking processing by utilizing the detection result obtained by the object detection unit 162. Note that these are examples of image processing that can be applied by the image processing unit 152 and do not limit the image processing to be applied by the image processing unit 152.

Among the different types of image processing described above, the color interpolation processing and the correction processing are also referred to as development processing of RAW image data. The image processing unit 152 applies image processing including color interpolation processing and correction processing to the RAW image data, generates, for example, display image data for display on a display 150 and recording image data for recording on a recording unit 157, and stores the data in the RAM 154.

The CPU 151 uses the evaluation values generated by the image processing unit 152 to determine the image capture conditions (aperture value, shutter speed (exposure time), and image capture sensitivity) for the image capture apparatus 100. The CPU 151 controls the aperture control unit 105 in accordance with the determined aperture value and shutter speed. The CPU 151 also controls the image capture control unit 143 in accordance with the determined exposure time and image capture sensitivity.

A codec 153 encodes data and decodes encoded data. The codec 153 can support multiple encoding schemes. The codec 153 encodes the recording image data and the RAW image data stored in the RAM 154. The codec 153 also decodes encoded data read from the recording unit 157 or received from an external device and stored in the RAM 154.

The RAM 154, which is a so-called main memory, is used for storing programs and data necessary for executing the programs, and for temporarily storing image data, and the like. A portion of the RAM 154 is used as a VRAM.

The ROM 155 is an electrically rewritable nonvolatile memory. The ROM 155 stores the programs and constants executed by the CPU 151, various setting values of the image capture apparatus 100, GUI data, and the like. The programs stored in the ROM 155 are read into the RAM 154 when the image capture apparatus 100 enters a power-on state from a power-off state, and are executed by the CPU 151.

The display 150 is, for example, a liquid crystal display (LCD). A moving image being captured can be displayed on the display 150 in real time to make the display 150 function as an electronic viewfinder (EVF). The display 150 also displays a GUI screen, such as a menu screen, displays a recorded image, and displays information such as the state and setting values of the image capture apparatus 100.

The object detection unit 162 applies predetermined subject detection processing to the image data (for example, display image data) stored in the RAM 154 and detects a region (subject region) determined to contain a captured image of a predetermined subject. In the present embodiment, the object detection unit 162 can apply subject detection processing multiple times with different accuracy and processing time. Hereafter, it is presumed that the object detection unit 162 can apply first subject detection processing and second subject detection processing having a lower detection accuracy and a shorter processing time than those of the first subject detection processing. However, alternatively, three or more types of subject detection processing may be applied.

As an example, it is presumed that the first subject detection processing is for detecting a feature region using a Haar-Like feature, and the second subject detection processing is for detecting a feature region on the basis of color distribution. It is also presumed that each of the first subject detection processing and the second subject detection processing has already been trained for the subject to be detected. When a feature region is to be detected on the basis of color distribution, a target region can be detected as a feature region if the color distributions of the target area and its peripheral region differ by a predetermined amount or more. The second subject detection processing readily extracts the boundary between the subject region and the background, but has a higher probability of erroneously detecting the background as the subject region than that of the first subject detection processing.

The first subject detection processing and the second subject detection processing may be executed by applying different parameters for each type of subject to be detected. For example, the first subject detection processing and the second subject detection processing can be applied by using parameters to multiple kinds of objects that can be main subjects, such as faces of people or animals, automobiles, airplanes, railways, birds, flowers, and the like.

An operation unit 156 is a generic name for an input device provided for a user to give an instruction to the image capture apparatus 100. The input device includes buttons, keys, dials, touch screens, and the like. In a case when the display 150 is a touch screen, the display 150 also functions as the operation unit 156. Functions are statically or dynamically assigned to the input device constituting the operation unit 156. When an operation of the input device is detected, the CPU 151 executes an operation corresponding to the detected operation.

The defocus calculation unit 163 calculates a defocus amount of a focus detection region through a phase difference detection scheme by using a signal pair obtained from a dedicated focusing sensor or a signal pair generated from image data by the image processing unit 152. The focus detection region for focusing the lens unit 101 within an image capture range is set by the user or the CPU 151.

The CPU 151 controls the focusing control unit 133 on the basis of the defocus amount calculated by the defocus calculation unit 163. This causes the FM 132 to drive the focusing lens 131 to a position corresponding to the defocus amount, and the lens unit 101 focuses on the focus detection region.

A battery 159 is, for example, a secondary battery mounted on the image capture apparatus 100. The battery 159 is managed by a power management unit 158 and supplies power to the entire image capture apparatus 100.

A position/attitude detection unit 161 is a position/attitude sensor, such as a gyro, an acceleration sensor, or an electronic compass, and outputs values representing the attitude and movement of the image capture apparatus 100 in a predetermined cycle. The output values of the position/attitude detection unit 161 are stored in the RAM 154.

Template Stabilization Processing

Figure 2:
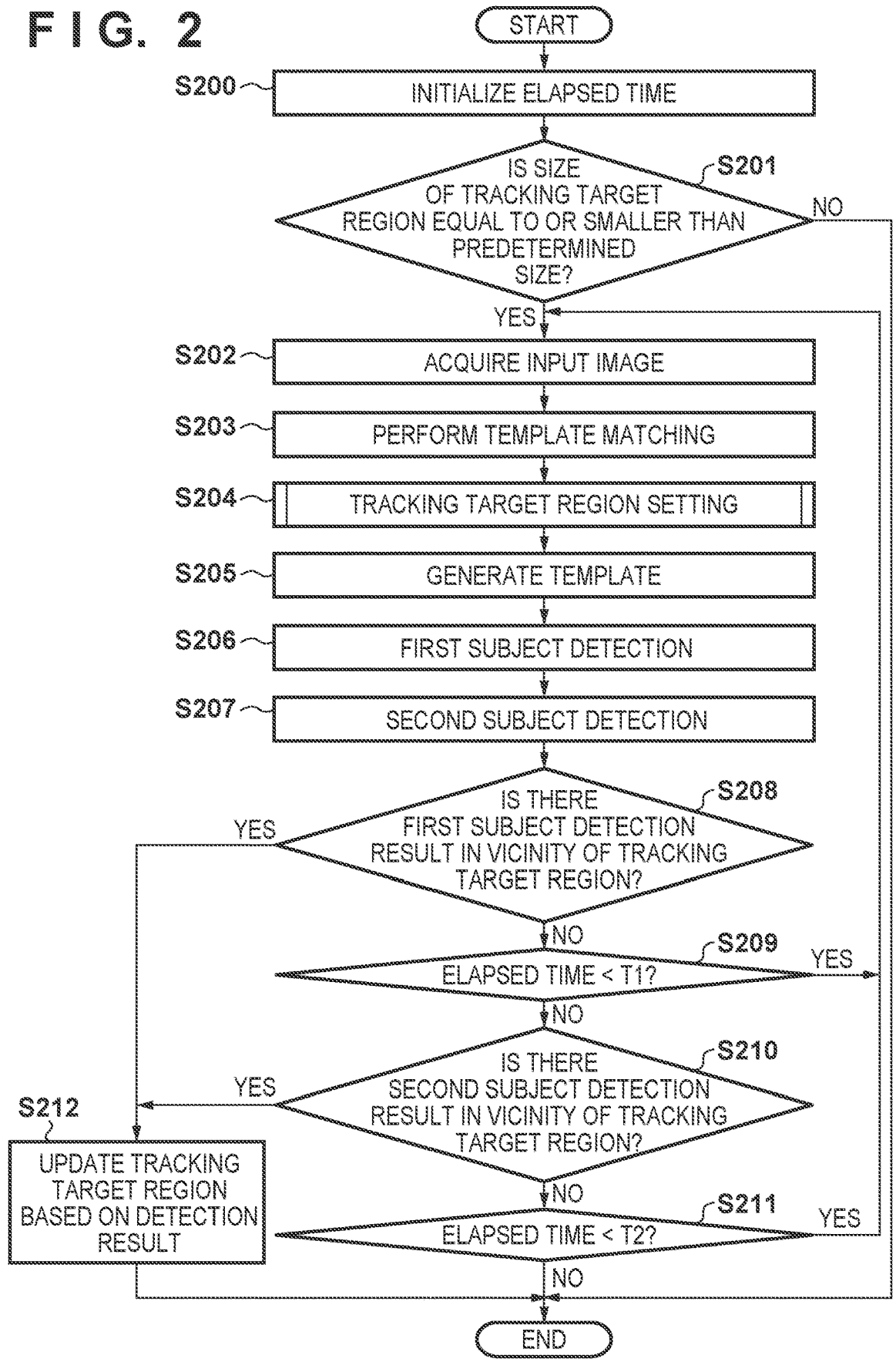
FIG. 2 is a flowchart related to template stabilization processing according to an embodiment.

An example of the template stabilization processing performed at the beginning of the subject tracking processing in the present embodiment will now be described with reference to the flowchart in FIG. 2. The subject tracking processing is executed, for example, during image capture of a moving image by the image capture apparatus 100 in response to a tracking target region being specified by a user through the operation unit 156. There is no limitation to the method of specifying the tracking target region, and a range or a position in a live view image displayed on the display 150 may be specified by any method using a touch operation or an input device. For example, the user can specify a tracking target region by tapping on the live view image to specify the position of a subject to be tracked or by framing the image capture apparatus 100 so that a subject to be tracked is positioned at the center of the live view image and then pressing a predetermined button on the operation unit 156.

The template stabilization processing is for setting an appropriate tracking target region, for example, when a user specifies a position shifted from the intended subject as the position of the tracking target region, or while framing might not be set.

In step S200, the CPU 151 initializes the variable t representing the elapsed time of the tracking processing to zero and starts measurement of the elapsed time with a timer. Alternatively, the CPU 151 may obtain the current time from a built-in clock and store the current time in the RAM 154 as the start time of the tracking processing.

In step S201, the CPU 151 determines whether or not the size of the specified tracking target region is equal to or less than a predetermined size, executes step S202 if the size is determined to be equal to or less than the predetermined size, and executes the template stabilization processing if the size is not determined to be equal to or less than the predetermined size. Note that when a user specifies the position of the tracking target region and the size of the tracking target region is set by the image capture apparatus 100 (the CPU 151), step S201 is skipped.

When the size of the specified tracking target region is small, there is a high possibility that the specified tracking target region is shifted from the subject region. Thus, the template stabilization processing is executed. In contrast, when the size of the tracking target region is not small, there is a low possibility that the tracking target region is shifted from the subject region. Thus, normal subject tracking processing using the specified tracking target region as a template is executed without performing the template stabilization processing.

In step S202, the CPU 151 captures one frame of a moving image through the image capture control unit 143. As a result, RAW image data for one frame is stored in the RAM 154. The image processing unit 152 generates display image data from the RAW image data and stores the display image data in the RAM 154.

In step S203, the image processing unit 152 serving as a detecting unit uses the tracking target region specified by the user or an updated tracking target region as a template and performs template matching processing on the display image data stored in the RAM 154. This corresponds to the processing of searching for a subject region in the current frame. A region similar to the template is detected in the current frame through template matching. Note that, since there is no template to be used for the first frame immediately after the subject tracking processing is started, step S203 is skipped.

In step S204, the image processing unit 152 serving as a setting unit sets a tracking target region in the image data of the current frame. For the first frame immediately after the subject tracking processing is started, the tracking target region specified by the user or a rectangular region having a predetermined size around a position (coordinates) specified by the user is set as the tracking target region. The setting processing of the tracking target region for the second and subsequent frames will be described in detail below.

In step S205, the data of the tracking target region set in step S204 among the display image data of the current frame stored in the RAM 154 is stored in the RAM 154 as a template by the image processing unit 152, serving as a generating unit. Note that, in the present embodiment, the template is updated for each frame. However, when a predetermined condition is satisfied, such as when the reliability of the tracking target region set in step S204 is low or when the frame rate is high, the template may not be updated in step S205, and the current template may be maintained.

In step S206, the object detection unit 162 applies the first subject detection processing to the display image data stored in the RAM 154. As a processing result, the object detection unit 162 stores the total number of detected subject regions, the position, size, reliability, etc., of each subject region in the RAM 154.

In step S207, the object detection unit 162 applies the second subject detection processing to the display image data stored in the RAM 154. As a processing result, the object detection unit 162 stores the total number of detected subject regions, the position, size, reliability, etc., of each subject region in the RAM 154.

In steps S208 to S212, the CPU 151 determines which one of the results of the first subject detection processing and the second subject detection processing is to be used.

In step S208, the CPU 151 refers to the RAM 154 and determines whether or not a subject region residing at a distance less than or equal to a predetermined value from the currently set tracking target region has been detected in the first subject detection processing. If the CPU 151 determines that a subject region residing at a distance less than or equal to a predetermined value from the currently set tracking target region has been detected in the first subject detection processing, the CPU 151 executes step S212, and, if not, executes step S209.

In step S209, the CPU 151 determines whether or not the time elapsed from the start of the subject tracking processing is less than a first predetermined time T1. If the elapsed time is less than the first predetermined time T1, the CPU ends the processing of the current frame and executes step S202. If the time elapsed from the start of the subject tracking processing is not determined to be less than the first predetermined time T1, the CPU 151 executes step S210.

In step S210, the CPU 151 refers to the RAM 154 and determines whether or not a subject region residing at a distance less than or equal to a predetermined value from the currently set tracking target region has been detected in the second subject detection processing. If a subject region residing at a distance less than or equal to a predetermined value from the currently set tracking target region has been detected in the second subject detection processing, the CPU 151 executes step S212, and, if not, executes step S211.

In step S211, the CPU 151 determines whether or not the time elapsed from the start of the subject tracking processing is less than a second predetermined time T2 (>T1). If the elapsed time is less than the second predetermined time T2, the CPU ends the processing of the current frame and executes step S202. If the time elapsed from the start of the subject tracking processing is not determined to be less than the second predetermined time T2, the CPU 151 ends the template stabilization processing. The CPU 151 then continues the subject tracking processing by template matching using the tracking target region at the second predetermined time T2 as a template.

In step S212, the CPU 151 updates the setting of the tracking target region on the basis of the detection result of the first subject detection processing or the second subject detection processing. For example, the CPU 151 sets a new tracking target region as the subject region residing closest to the currently set tracking target region at a distance less than or equal to a predetermined value. The image processing unit 152 updates the template in accordance with the updated tracking target region. Note that the size and the shape may not be constant, since the tracking target region updated in step S212 is based on the detected subject region. Alternatively, a rectangular region having the same size as that set in step S204 may be set as the updated tracking target region with the center or the centroid coordinates of the detected subject region as the center.

When step S212 is completed, the template stabilization processing ends. Thereafter, the subject tracking processing using template matching continues, with the tracking target region updated in step S212 as a template.

About Tracking Target Region Setting

The tracking target region setting processing in step S204 will be described in more detail with reference to the flowchart in FIG. 3.

In step S300, the image processing unit 152 acquires, from the RAM 154, information of the region (candidate region) having the highest similarity with the template in the current frame, which has been detected through the template matching in step S203. Subsequently, the image processing unit 152 extracts a rectangular region of a predetermined size containing the candidate region from the current frame and defines this region as a first region. The first region may be, for example, a rectangular region centered on the center or the centroid coordinates of a candidate region, a rectangular region containing the most candidate regions, a rectangular region containing the most candidate regions and having a center closest to the center or the centroid coordinates of the candidate region, but is not limited thereto.

In step S301, the image processing unit 152 extracts a region of the current frame corresponding to the previously set (updated) tracking target region and defines this region as a second region. Here, the tracking target region set (updated) in step S205 or S212 in the processing of the previous frame is the previously set (updated) tracking target region. When the tracking target region is updated in step S212, the image processing unit 152 extracts a rectangular region having a predetermined size centered on the center or the centroid coordinates of the tracking target region from the current frame and defines this region as a second region. The first and second regions are rectangular regions of the same size.

The first and second regions are substantially the same unless the image capture range is changed by, for example, the user panning the camera between the previous frame and the current frame.

In step S302, the image processing unit 152 calculates an evaluation value for each of the first region and the second region acquired in steps S300 and S301, respectively. The evaluation values to be calculated here may be any evaluation values representing the subject-likeness (not being the background) of the image in the region. The evaluation values represent the certainty that a subject, which is not part of the background, is included in the region. The calculation processing for the evaluation values is simpler arithmetic processing, unlike the processing for detecting a specific subject, such as the subject detection processing performed by the object detection unit 162.

As an example, in the present embodiment, a contrast value of the region is calculated as the evaluation value. The contrast value is the sum of the absolute differences of the values of adjacent pixel pairs in the horizontal direction in the region. The larger the contrast value, the more likely the image in the region is a subject. Note that any one of the sum of the absolute values of specific band components (for example, high-frequency components) extracted by applying filter processing to the region, a known feature quantity, and a motion quantity may be calculated as the evaluation value.

In step S303, the image processing unit 152 compares the evaluation value of the first region calculated in step S302 with the evaluation value of the second region. The image processing unit 152 executes step S304 if the evaluation value of the second region is greater and executes step S305 if the evaluation value of the second region is equal to or less than the evaluation value of the first region. Note that, if the evaluation value of the second region is greater than the evaluation value of the first region and the difference between the evaluation values is equal to or larger than a predetermined value, step S304 may be executed. Otherwise, step S305 may be executed.

In step S304, the image processing unit 152 sets the second region as the tracking target region and ends the tracking target region setting processing.

In step S305, the image processing unit 152 sets the first region as the tracking target region and ends the tracking target region setting processing.

A template is generated in step S205 for the tracking target region set in this way. Note that the magnitude of the evaluation value calculated in step S302 can be used as the reliability of the tracking target region in the template generation processing in step S205.

Figure 4A:
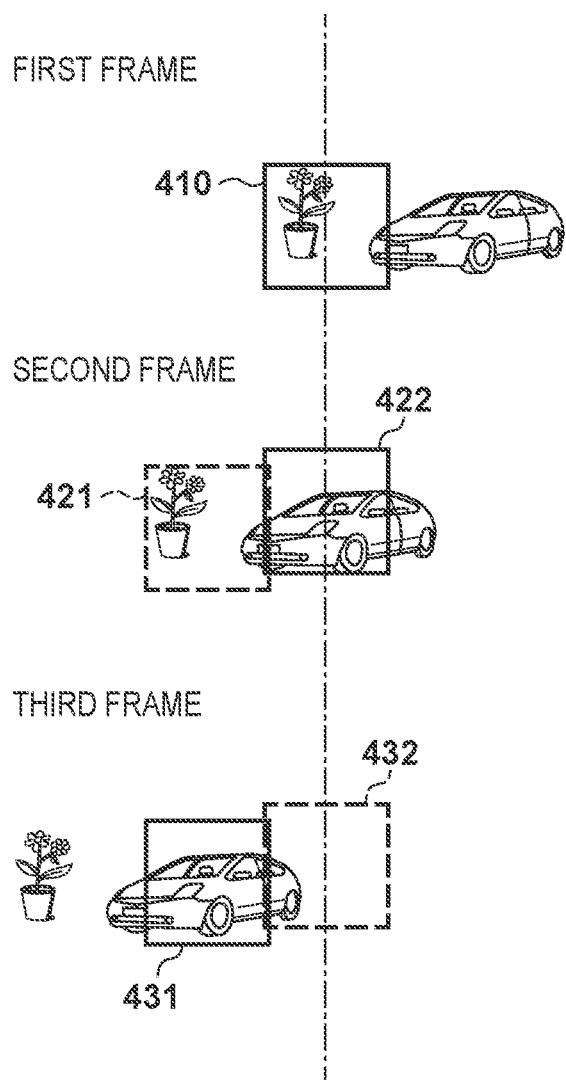
FIGS. 4A and 4B are schematic diagrams for explaining the effect of the tracking target region setting processing according to an embodiment.
Figure 4B:
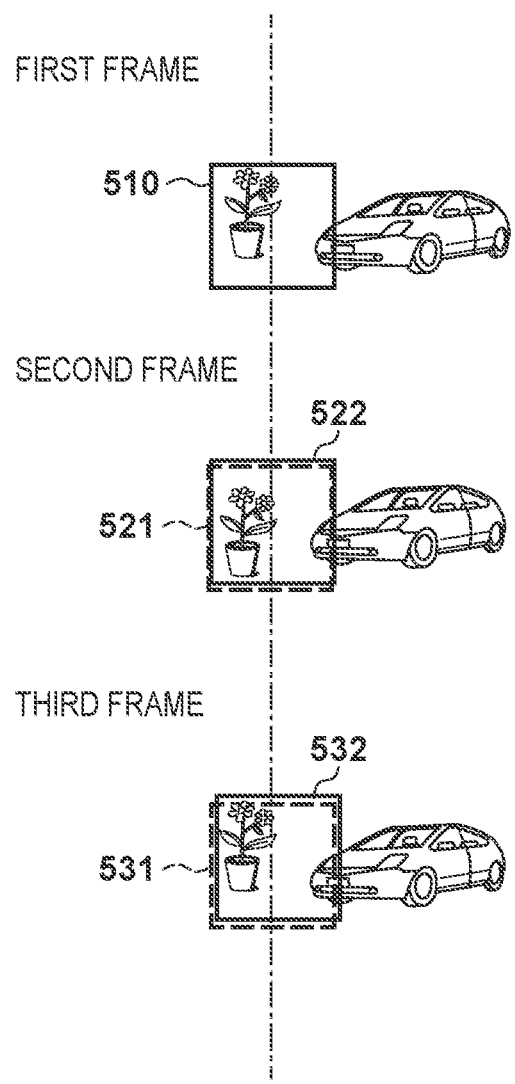

FIGS. 4A and 4B are diagrams schematically illustrating the effect of the tracking target region setting processing described with reference to FIG. 3. Here, FIGS. 4A and 4B illustrate identical scenes in which the tracking target regions intended by the user are different, but identical tracking target regions are specified. To be specific, in FIGS. 4A and 4B, tracking target regions 410 and 510 are specified at same positions in the identical scenes. However, the tracking target intended by the user is an automobile in FIG. 4A and is a plant in FIG. 4B. To facilitate explanation and understanding, it is presumed here that the automobile is stationary or the movement of the automobile between frames is negligible. It is also presumed that the tracking target regions are not updated on the basis of the first subject detection processing and the second subject detection processing in steps S208 to S212.

In the case of FIG. 4A, the tracking target region 410 is specified at a position shifted from the center of the intended tracking target (automobile) in the first frame. The tracking target region 410 contains only a small portion of the intended tracking target while containing a large portion of another subject (plant).

On the other hand, in the case of FIG. 4B, the tracking target region 510 is specified at a position containing the intended tracking target (plant) in the first frame. The tracking target region 510 includes almost none of the other subject (automobile).

In the case of FIG. 4A, the tracking target region 410 is generated as a template in step S205 in the processing of the first frame.

Here, it is presumed that the user moves the image capture apparatus 100 between the first frame and the second frame, and the image capture range is changed (framed) in the direction in which the intended tracking target (automobile) comes to the center of the tracking target region 410 (toward the right in the drawing).

In the template matching, in step S203, in the processing of the second frame, a region 421 is detected as the region having the highest similarity with the template in the current frame. In step S300, the region 421 is extracted from the current frame as a first region. In step S301, a region 422 at the same position as that of the specified tracking target region 410 is extracted from the current frame as a second region.

In step S302, evaluation values are calculated for the first region (region 421) and the second region (region 422). When the evaluation value of the second region (region 422) becomes greater than that of the first region (region 421), the second region (region 422) is set as the tracking target region in step S304.

Thus, the region 422 is generated as the template in step S205.

As the framing continues, the image capture range changes even more in the third frame. In the template matching in step S203 in the processing of the third frame, a region 431 is detected as the region having the highest similarity with the template in the current frame. In step S300, the region 431 is extracted from the current frame as the first region. In step S301, a region 432 at the same position as the region 422 in the previous frame is extracted from the current frame as the second region.

In step S302, evaluation values are calculated for the first region (region 431) and the second region (region 432). When the evaluation value of the first region (region 431) becomes greater than that of the second region (region 432), the first region (region 431) is set as the tracking target region in step S305.

Thus, the region 431 is generated as the template in step S205.

As described above in the present embodiment, a region having a higher subject-likeness is set as the tracking target region between the region previously extracted as the template and the region detected as the region having the highest similarity with the template in the current frame. For this reason, even when a position slightly shifted from the intended subject is specified as a tracking target region, the user can change the image capture range in the direction of the subject intended for tracking so that the intended subject is tracked.

In the situation illustrated in FIG. 4B, an appropriate tracking target region 510 is set for the subject (plant) intended for tracking in the first frame. In the processing of the first frame, the tracking target region 510 is generated as a template in step S205.

Here, the image capture range is not changed between the first and second frames. Thus, the image capture ranges in the first and second frames are substantially the same.

In the template matching in step S203 in the processing of the second frame, a region 521 is detected as the region having the highest similarity with the template in the current frame. In step S300, the region 521 is extracted from the current frame as the first region. In step S301, a region 522 at the same position as the specified tracking target region 510 is extracted from the current frame as the second region.

In step S302, evaluation values are calculated for the first region (region 421) and the second region (region 422). Since the first region (region 421) and the second region (region 422) are substantially identical, the evaluation value of the first region (region 421) is equal to or only slightly different from the evaluation value of the second region (region 422). Thus, the first region (region 421) is set as the tracking target region in step S305.

As a result, the region 421 is generated as a template in step S205.

The image capture range is substantially identical also in the third frame. In the template matching in step S203 in the processing of the third frame, a region 531 is detected as the region having the highest similarity with the template in the current frame. In step S300, the region 531 is extracted from the current frame as the first region. In step S301, a region 532 at the same position as the region 522, in the previous frame, is extracted from the current frame as the second region.

Since the first region (region 421) and the second region (region 422) are substantially identical also in the third frame, the evaluation value of the first region (region 421) is equal to or only slightly different from the evaluation value of the second region (region 422). Thus, the first region (region 421) is set as the tracking target region in step S305.

The processing in steps S208 to S212 will now be further described.

As described above, the first subject detection processing can detect a subject region more accurately than the second subject detection processing, but its computational load is higher than that of the second subject detection processing. Thus, the first subject detection processing requires a longer time to obtain a detection result than the second subject detection processing.

When the first subject detection processing detects a subject region residing at a distance equal to or less than a threshold value from the current tracking target region, it is preferable to prioritize the detection result of the first subject detection processing. However, when the first subject detection processing does not detect a subject region residing at a distance equal to or less than a threshold value from the current tracking target region, the detection result of the second subject detection processing is used. In the present embodiment, the first predetermined time T1 is set as an upper limit of the time for waiting for detection of a subject region in the first subject detection processing. Before the elapse of the first predetermined time T1, the tracking target region is determined in the above-described tracking target region setting processing.

If the first subject detection processing detects a subject region residing at a distance equal to or less than a threshold value from the current tracking target region before the elapse of the first predetermined time T1, the tracking target region is updated in step S212 on the basis of the highly accurate detection result, so that the tracking accuracy is expected to be improved in the subsequent frames.

If the first subject detection processing does not detect a subject region residing at a distance equal to or less than a threshold value from the current tracking target region after the first predetermined time T1 elapses, the detection result of the second subject detection processing is used. In such a case, also, the tracking target region is appropriately updated in the above-described tracking target region setting processing before the elapse of the first predetermined time T1. If the second subject detection processing detects a subject region residing at a distance equal to or less than a threshold value from the current tracking target region before the elapse of the second predetermined time T2, step S212 is executed.

In step S212, among the subject regions detected in the second subject detection processing, the tracking target region residing (for example, overlapping) at a distance equal to or less than a threshold value from the current tracking target region can be updated to suppress the influence of erroneous detection in the second subject detection processing.

Setting Method of First Predetermined Time T1

The first predetermined time T1 may be appropriately determined in consideration of frame rate, etc., but, for example, for a state in which it is difficult to accurately specify a tracking target region, the first predetermined time T1 may be longer than the state in which it is not difficult.

This is because, even if the specified tracking target region is shifted from the intended subject, it is desirable to set the tracking target region to the intended subject in the tracking target region setting processing before the elapse of the detection result of the second subject detection processing is used after the first predetermined time T1.

For example, if the focal length of the lens unit 101 is long, the image capture range cannot be readily stabilized, and the image in the live view display readily moves. It is difficult to specify an intended position in an image having an unstable display position, and thus there is a high possibility that a position shifted from the intended position will be specified. Thus, when the focal length of the lens unit 101 at the time the tracking target region is specified is equal to or greater than a threshold value (telephoto side), the CPU 151 may increase the first predetermined time T1 to be longer than when the focal length is less than the threshold value. Alternatively, the CPU 151 may increase the first predetermined time T1 in proportion to the focal length of the lens unit 101 at the time the tracking target region is specified.

Alternatively, the first predetermined time T1 may be determined in consideration of the movement of the image capture apparatus 100 when the tracking target region is specified. For example, if the image capture apparatus 100 is moving when the tracking target region is specified, there is a high possibility that the specified tracking target region is shifted from the intended subject. Thus, if the CPU 151 determines that the image capture apparatus 100 has been moving when the tracking target region was specified, the first predetermined time T1 can be made longer than when the CPU 151 does not determine that the image capture apparatus 100 has been moving. The CPU 151 can determine that the image capture apparatus 100 has been moving on the basis of the output signals from the position/attitude detection unit 161 if the amount of change in the magnitude of the movement per unit time of either the yaw direction or the pitch direction of the image capture apparatus 100 is equal to or greater than a predetermined threshold value.

Alternatively, the first predetermined time T1 may be different depending on whether or not a moving object region exists in the vicinity of the tracking target region. If a moving object region exists in the vicinity of the tracking target region, the CPU 151 determines that there is a high possibility that the specified tracking target region is shifted from the intended subject and increases the first predetermined time T1 to be longer than when a moving object region does not exist in the vicinity of the tracking target region. Note that the moving object region can be detected through any known technique, such as the technique described in Japanese Patent Laid-Open No. 2020-95673.

The CPU 151 may determine that the first predetermined time T1 has elapsed by determining that the tracking target region has stabilized. For example, the CPU 151 can determine that the tracking target region has stabilized when the percentage of the number of times the first region has been set as the tracking target region is equal to or greater than a threshold value in the multiple times of tracking target region setting processing executed within the latest predetermined period or in a predetermined number of times of tracking target region setting processing executed most recently.

The first region is set as the tracking target region when the template set in the previous frame is considered appropriate. Thus, for example, if the percentage of the number of times the first region has been set as the tracking target region in the multiple times of tracking target region setting processing executed most recently is equal to or greater than the threshold value (for example, 80% or more), there is a high possibility that the tracking target region is continuously set to the appropriate subject. For this reason, even if the detection result of the second subject detection processing is used, the accuracy is considered to be secured, and it can be determined that the first predetermined time T1 has elapsed.

Setting Method of Second Predetermined Time T2 In the present embodiment, if a subject region residing at a distance equal to or less than a threshold value from the current tracking target region is not detected in the first subject detection processing and the second subject detection processing during the second predetermined time T2, the template stabilization processing ends, and normal subject tracking processing starts.

Thus, the second predetermined time T2 is set to end, for example, after the tracking target region is stably set. Basically, the second predetermined time T2 can be set in the same manner as the first predetermined time T1. Most simply, the second predetermined time T2 may be twice as long as the first predetermined time T1. Alternatively, the second predetermined time T2 may be set to be the sum of the first predetermined time T1 and the time required to detect the subject region in the second subject detection processing when a subject region exists.

FIG. 5 schematically illustrates the influence of the first predetermined time T1 on the template stabilization processing in the same situation as in FIG. 4A.

In FIG. 5, the case "a" represents a situation where the first predetermined time T1 is substantially not provided (i.e., the first predetermined time T1=0). The case "b" represents a situation where the first predetermined time T1 is sufficient for stabilizing the tracking target region in the first region by the tracking target region setting in step S204. The case "c" represents a situation where the first predetermined time T1 is the same that in the case "b", but a subject region residing at a distance equal to or less than a threshold value from the current tracking target region is not detected in the first subject detection processing, even after the first predetermined time T1 elapses.

In the following description, the subject region detected in the first subject detection processing and the second subject detection processing is a subject region residing at a distance equal to or less than a threshold value from the current tracking target region. Reference numeral 601 denotes a subject region detected in the first subject detection processing, and reference numeral 602 denotes a subject region detected in the second subject detection processing.

In the case "a", at elapsed time t=0, that is, at the time point of the first predetermined time T1, a subject region is not detected in the first subject detection processing, and a subject region is detected in the second subject detection processing.

In such a case, the tracking target region based on a subject region 602 detected in the second subject detection processing at the elapsed time t=0 is set in step S212. In the subsequent frames, subject tracking processing is performed by using the tracking target region extracted from the current frame and based on the subject region 602 as a template.

In the first frame, the tracking target region is set at a position shifted from the intended subject, and the tracking target region contains an unintended subject. In such a case, the subject region, which resides at a distance equal to or less than a threshold value from the current tracking target region, and is detected in the second subject detection processing, is a region of an unintended subject. Since the first predetermined time T1 is substantially not provided, a change in the image capture range by the user does not affect the setting of the tracking target region, and tracking of the unintended subject continues.

In the case "b", the first predetermined time T1 has been set to T1>0 in the case "a". Thus, the tracking target region setting processing in step S204 is repeatedly executed until a subject region is detected in the first subject detection processing or the time T1 elapses. The subject region 602 detected in the second subject detection processing is not taken into consideration of the setting of the tracking target region until the time T1 elapses.

The user pans the image capture apparatus 100 in the direction of the automobile between the first frame and the second frame, so that the second region 422 of the second frame contains the automobile. In this way, the evaluation value of the second region becomes greater than that of the first region in the tracking target region setting processing (step S204) for the second frame, and the second region 422 is set as the tracking target region for the next frame. At this point, since a subject region 601 overlapping the tracking target region 422 is detected in the first subject detection processing, the processing transitions from step S208 to step S212.

In step S212, the tracking target region 422 is updated on the basis of the result of the first subject detection processing. This example represents the subject region 601 detected in the first subject detection processing that is set as the tracking target region of the next frame. The template stabilization processing ends without the passage of the first predetermined time T1, and, for the third and subsequent frames, the subject tracking processing is executed by using the subject region 601 as a template.

By setting the first predetermined time T1, the user can pan the image capture apparatus 100 in the direction of the intended subject to increase the probability of successful tracking of the intended subject, even when the tracking target region is specified at a position shifted from the intended subject.

In the case "c", a first predetermined time T1 similar to that in the case "b" is set, and a subject region is not detected in the first subject detection processing when the first predetermined time T1 has elapsed.

In the first frame, the subject region is detected in the second subject detection processing, but the detection result of the second subject detection processing is not taken into consideration in setting the tracking target region because the first predetermined time T1 has not yet elapsed.

The user pans the image capture apparatus 100 to the direction of the automobile between the first frame and the second frame, so that the second region 422 of the second frame contains the automobile and no longer contains the plant. In the tracking target region setting processing (step S204) for the second frame, the evaluation value of the second region is greater than that of the first region, and the second region 422 is set as the tracking target region of the next frame.

This causes the subject region 602 that is the detection result of the second subject detection processing to change from the region of the plant to the region of the automobile. However, since the first predetermined time T1 has not yet elapsed, the processing transitions from step S209 to step S202, and the detection result of the second subject detection processing is not considered.

Until the first predetermined time T1 elapses, a state in which the first and second regions are substantially identical continues. In the tracking target region setting processing illustrated in FIG. 3, the first region is continuously set as the tracking target region during the processing, but the tracking target region is substantially identical to the second region 422 in the second frame.

In the m-th frame, after the elapse of the first predetermined time T1, without detection of the subject region in the first subject detection processing, the processing transitions from step S209 to step S210, and the detection result of the second subject detection processing is taken into consideration. The processing then transitions from step S210 to step S212, and a tracking target region based on the subject region 602 overlapping the set tracking target region (first region 421) is set.

This example represents the subject region 602 detected in the second subject detection processing set as the tracking target region of the next frame ((m+1)-th frame). The template stabilization processing ends without the passage of the second predetermined time T2, and, for the (m+1)-th and subsequent frames, the subject tracking processing is executed by using the subject region 602 as a template.

By setting the first predetermined time T1, the user can pan the image capture apparatus 100 in the direction of the intended subject to increase the probability of successful tracking of the intended subject, even when the tracking target region is specified at a position shifted from the intended subject.

Thus, even when the tracking target region is set on the basis of the detection result of the second subject detection processing, the possibility of erroneous detection of the second subject detection processing influencing the setting of the tracking target region can be reduced.

According to the present embodiment, for the current frame, the tracking target region is updated to a region determined to have a higher subject-likeness on basis of the evaluation value between the region detected by pattern matching and the region corresponding to the tracking target region of the previous frame. Thus, even when the user specifies the tracking target region at a position shifted from the intended subject, the intended subject can be tracked by moving the image capture range in the direction of the intended subject, thereby enhancing the ease of use.

By updating the tracking target region by using the detection result of the subject detection processing, the subject tracking accuracy can be further enhanced. By executing the subject detection processing multiple times with different accuracies, the tracking target region can be set on the basis of the subject detection result even when it is not possible to prioritize the results of subject detection processing having a higher accuracy, and to use the result of the subject detection processing having the higher accuracy.

Furthermore, by using the result of the subject detection processing having a lower accuracy after the setting of the tracking target region based on the evaluation value is executed for a predetermined time, the possibility of an erroneous subject detection result being used can be reduced.

OTHER EMBODIMENTS

The above embodiments describe a configuration in which the detection result of the second subject detection processing is not used until the first predetermined time T1 elapses. However, the detection result of the second subject detection processing may be used before the elapse of the first predetermined time T1. For example, a degree of adoption for determining whether or not the subject detection result is to be adopted may be provided, and, for the time before the elapse of the first predetermined time T1, the degree of adoption of the detection result of the second subject detection processing may be set low and the degree of adoption of the detection result of the first subject detection processing may be set high. In such a case, one of the detection results of the first subject detection processing and the second subject detection processing can be used with a probability in accordance with the degree of adoption before the elapse of the first predetermined time T1.

In the above embodiments, the template stabilization processing is executed at the start of the subject tracking processing, and, after the end of the stabilization processing, the previous subject tracking processing is executed. However, the template stabilization processing may be executed not only at the start of the subject tracking processing, but also, during the execution of the subject tracking processing. For example, when the focus detection region is set at a position different from the tracking target region, the template stabilization processing may be performed for the tracking target region containing the focus detection region.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
one or more processors that execute a program and thereby function as:
a setting unit that sets a tracking target region;
a generating unit that generates a template to be used in template matching based on a set tracking target region;
a detecting unit that detects, in a current image, a first region that is similar to a template generated by the generating unit, by applying template matching using the template to the image; and
a subject detecting unit that detects a subject region, in which a predetermined subject is captured, in an image, wherein, if the subject detecting unit has detected the subject region, the setting unit sets the tracking target region based on the subject region,
wherein the setting unit sets, as a new tracking target region, the first region detected in the current image by the detecting unit or a second region of the current image whose position corresponds to a previously set tracking target region,
wherein the subject detecting unit detects a subject region through first subject detection processing and second subject detection processing having a lower detection accuracy than that of the first subject detection processing, the setting unit uses a detection result of the first subject detection processing with a higher priority than a detection result of the second subject detection processing, and the setting unit does not use a processing result of the second subject detection processing until an elapse of a first predetermined time, and
wherein the image processing apparatus is an image capture apparatus, and the first predetermined time is set longer in a case when a focal length of a lens unit of the image capture apparatus at an initial setting of the tracking target region is equal to or greater than a threshold value than in a case when the focal length is less than the threshold value.

2. The image processing apparatus according to claim 1, wherein the setting unit sets whichever one of the first region and the second region has a higher subject-likeness as the new tracking target region.

3. The image processing apparatus according to claim 1, wherein the setting unit calculates a predetermined evaluation value representing subject-likeness for each of the first region and the second region, and sets the first region or the second region as the new tracking target region based on the evaluation values.

4. The image processing apparatus according to claim 1, wherein the setting unit sets the tracking target region based on, among subject regions detected by the subject detecting unit, a subject region located at a distance equal to or less than a predetermined value from whichever one of the first region and the second region was set as the tracking target region.

5. The image processing apparatus according to claim 1, wherein setting of the tracking target region, generation of the template, and detection of the first region are repeatedly executed until the subject detecting unit detects a subject region or until a predetermined time elapses.

6. The image processing apparatus according to claim 1, wherein the first predetermined time is set longer in a case if the image processing apparatus is moving when the tracking target region is initially set to the image processing apparatus than in a case if the image processing apparatus is not moving when the tracking target region is initially set to the image processing apparatus.

7. The image processing apparatus according to claim 1, wherein the first predetermined time is set longer in a case when a moving object region exists in a vicinity of the tracking target region than in a case when the moving object region does not exist in the vicinity of the tracking target region.

8. The image processing apparatus according to claim 1, wherein the setting unit determines that the first predetermined time has elapsed if a frequency of the first region being set as the tracking target region is equal to or greater than a threshold value.

9. An image processing apparatus comprising:
one or more processors that execute a program and thereby function as:
a setting unit that sets a tracking target region;
a detecting unit that detects, based on a set tracking target region, a first region similar to the tracking target region in a current image; and
a subject detecting unit that detects a subject region, in which a predetermined subject is captured, in an image, wherein, if the subject detecting unit has detected the subject region, the setting unit sets the tracking target region based on the subject region,
wherein the setting unit sets, as a new tracking target region, the first region detected in the current image or a second region of the current image whose position corresponds to a previously set tracking target region,
wherein the subject detecting unit detects a subject region through first subject detection processing and second subject detection processing having a lower detection accuracy than that of the first subject detection processing, the setting unit uses a detection result of the first subject detection processing with a higher priority than a detection result of the second subject detection processing, and the setting unit does not use a processing result of the second subject detection processing until an elapse of a first predetermined time, and
wherein the image processing apparatus is an image capture apparatus, and the first predetermined time is set longer in a case when a focal length of a lens unit of the image capture apparatus at an initial setting of the tracking target region is equal to or greater than a threshold value than in a case when the focal length is less than the threshold value.

10. The image processing apparatus according to claim 9, wherein the setting unit sets whichever one of the first region and the second region of the image has a greater evaluation value as the new tracking target region.

11. The image processing apparatus according to claim 10, wherein the evaluation value is a value indicating a magnitude of contrast.

12. An image processing method, performed by an image capture apparatus, for subject tracking, the method comprising:
setting a tracking target region;
generating a template to be used in template matching based on the set tracking target region;
detecting, in a current image, a first region that is similar to a template generated by the generating, by applying template matching to the image using the template; and
detecting a subject region, in which a predetermined subject is captured, in an image, wherein, if the subject region has been detected, the setting includes setting the tracking target region based on the subject region,
wherein the setting includes setting, as a new tracking target region, the first region detected in the current image in the detecting or a second region of the current image whose position corresponds to a previously set tracking target region,
wherein the detecting a subject region detects the subject region through first subject detection processing and second subject detection processing having a lower detection accuracy than that of the first subject detection processing, the setting uses a detection result of the first subject detection processing with a higher priority than a detection result of the second subject detection processing, and the setting does not use a processing result of the second subject detection processing until an elapse of a first predetermined time, and
wherein the first predetermined time is set longer in a case when a focal length of a lens unit of the image capture apparatus at an initial setting of the tracking target region is equal to or greater than a threshold value than in a case when the focal length is less than the threshold value.

13. An image processing method, performed by an image capture apparatus, for subject tracking, the method comprising:
setting a tracking target region;
detecting, based on a set tracking target region, a first region similar to the tracking target region in a current image; and
detecting a subject region, in which a predetermined subject is captured, in an image, wherein, if the subject region has been detected, the setting includes setting the tracking target region based on the subject region,
wherein the setting sets, as a new tracking target region, the first region detected in the current image or a second region of the current image whose position corresponds to a previously set tracking target region,
wherein the detecting a subject region detects the subject region through first subject detection processing and second subject detection processing having a lower detection accuracy than that of the first subject detection processing, the setting uses a detection result of the first subject detection processing with a higher priority than a detection result of the second subject detection processing, and the setting does not use a processing result of the second subject detection processing until an elapse of a first predetermined time, and
wherein the first predetermined time is set longer in a case when a focal length of a lens unit of the image capture apparatus at an initial setting of the tracking target region is equal to or greater than a threshold value than in a case when the focal length is less than the threshold value.

14. A non-transitory computer-readable storage medium storing a program that causes, when executed by a computer of an image capture apparatus, the computer to function as:
a setting unit that sets a tracking target region;
a generating unit that generates a template to be used in template matching based on a set tracking target region;
a detecting unit that detects, in a current image, a first region that is similar to a template generated by the generating unit, by applying template matching using the template to the image; and
a subject detecting unit that detects a subject region, in which a predetermined subject is captured, in an image, wherein, if the subject detecting unit has detected the subject region, the setting unit sets the tracking target region based on the subject region,
wherein the setting unit sets, as a new tracking target region, the first region detected in the current image by the detecting unit or a second region of the current image whose position corresponds to a previously set tracking target region,
wherein the subject detecting unit detects a subject region through first subject detection processing and second subject detection processing having a lower detection accuracy than that of the first subject detection processing, the setting unit uses a detection result of the first subject detection processing with a higher priority than a detection result of the second subject detection processing, and the setting unit does not use a processing result of the second subject detection processing until an elapse of a first predetermined time, and wherein the first predetermined time is set longer in a case when a focal length of a lens unit of the image capture apparatus at an initial setting of the tracking target region is equal to or greater than a threshold value than in a case when the focal length is less than the threshold value.

15. A non-transitory computer-readable storage medium storing a program that causes, when executed by a computer of an image capture apparatus, the computer to function as:
   a setting unit that sets a tracking target region;
   a detecting unit that detects, based on a set tracking target region, a first region similar to the tracking target region in a current image; and
   a subject detecting unit that detects a subject region, in which a predetermined subject is captured, in an image, wherein, if the subject detecting unit has detected the subject region, the setting unit sets the tracking target region based on the subject region, wherein the setting unit sets, as a new tracking target region, the first region detected in the current image or a second region of the current image whose position corresponds to a previously set tracking target region, wherein the subject detecting unit detects a subject region through first subject detection processing and second subject detection processing having a lower detection accuracy than that of the first subject detection processing, the setting unit uses a detection result of the first subject detection processing with a higher priority than a detection result of the second subject detection processing, and the setting unit does not use a processing result of the second subject detection processing until an elapse of a first predetermined time, and wherein the first predetermined time is set longer in a case when a focal length of a lens unit of the image capture apparatus at an initial setting of the tracking target region is equal to or greater than a threshold value than in a case when the focal length is less than the threshold value.

* * * * *